US008747193B2

(12) United States Patent
Bolte et al.

(10) Patent No.: US 8,747,193 B2
(45) Date of Patent: Jun. 10, 2014

(54) MEAT FABRICATION SYSTEM AND METHOD

(71) Applicants: Tom Bolte, Columbus, NE (US); David R. McKenna, Benton, KS (US); Dan Moore, Bellwood, NE (US)

(72) Inventors: Tom Bolte, Columbus, NE (US); David R. McKenna, Benton, KS (US); Dan Moore, Bellwood, NE (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 13/922,830

(22) Filed: Jun. 20, 2013

(65) Prior Publication Data
US 2013/0344787 A1     Dec. 26, 2013

Related U.S. Application Data

(62) Division of application No. 12/083,721, filed as application No. PCT/US2006/038645 on Sep. 29, 2006, now Pat. No. 8,485,871.

(60) Provisional application No. 60/722,144, filed on Sep. 30, 2005.

(51) Int. Cl.
   *A22C 25/16*     (2006.01)
(52) U.S. Cl.
   USPC ........................................... 452/140
(58) Field of Classification Search
   USPC ......... 452/136, 149–153, 155–159, 160, 166, 452/170
   See application file for complete search history.

(56) References Cited

U.S. PATENT DOCUMENTS

| 4,134,181 | A  |   | 1/1979  | Schneider, Jr. |         |
|-----------|----|---|---------|----------------|---------|
| 5,037,349 | A  |   | 8/1991  | Perreault      |         |
| 5,407,384 | A  |   | 4/1995  | Boody et al.   |         |
| 5,746,648 | A  |   | 5/1998  | Boeyen et al.  |         |
| 5,882,252 | A  |   | 3/1999  | Boody et al.   |         |
| 5,902,177 | A  | * | 5/1999  | Tessier et al. | 452/156 |
| 6,089,968 | A  |   | 7/2000  | Andre et al.   |         |
| 6,126,535 | A  | * | 10/2000 | Post           | 452/160 |
| 6,152,815 | A  | * | 11/2000 | Meerdink et al.| 452/122 |
| 6,547,658 | B2 | * | 4/2003  | Boody et al.   | 452/171 |
| 8,096,860 | B2 | * | 1/2012  | Bolte et al.   | 452/157 |
| 2010/0130114 | A1 |  | 5/2010  | Bolte et al.   |         |

FOREIGN PATENT DOCUMENTS

| EP | EP0714607 A  | 6/1996 |
| WO | WO03/032739  | 4/2003 |
| WO | WO2007/041590 | 4/2007 |

OTHER PUBLICATIONS

PCT International Search Report PCT/US2006/038645. Mailed Feb. 1, 2007. 3 pages.

* cited by examiner

*Primary Examiner* — Richard Price, Jr.

(57) ABSTRACT

The present invention includes meat fabrication systems and methods. The system according to one embodiment includes a conveyor (104) for advancing meat cuts, a cutting assembly (106) defining a cutting path (136) that intersects the conveyor (104), and at least one guide (160, 162, 163) that orientates the meat cuts on the conveyor relative to the cutting path such that the chine bones of the meat cut are separated from the remaining portions of the meat cuts as the meat cuts are advanced through the cutting path (136) by the conveyor (104).

12 Claims, 18 Drawing Sheets

MEAT FABRICATION SYSTEM AND METHOD

CROSS-REFERENCE TO RELATED APPLICATIONS

This application is a Divisional application of U.S. patent application Ser. No. 12/083,721, filed Feb. 1, 2010, and entitled MEAT FABRICATION SYSTEM AND METHOD, which claims the benefit of PCT Patent Application, Serial No. PCT/US06/038645, filed Sep. 29, 2006, entitled MEAT FABRICATION SYSTEM AND METHOD, which application claims priority to U.S. Provisional Application No. 60/722,144, filed Sep. 30, 2005, entitled MEAT FABRICATION SYSTEM AND METHOD, which are hereby incorporated by reference in their entirety.

TECHNICAL FIELD

The present invention relates to a meat fabrication system and method. More particularly, the present invention relates to systems and methods for separating chine bones and other material from consumable meat cuts.

BACKGROUND

In conventional meat processing operations, cuts of meat removed from the rib and loin of a slaughtered animal, including beef, pork and lamb, may be fabricated into various bone-in and boneless meat products. An important step in this fabrication process is the separation of the animals' vertebral column (or "chine") from these cuts of meat. This separation step (commonly referred to as "chining") is performed to enable workers to subsequently remove dorsal spinous processes, transverse processes, and ribs to provide meat products.

FIGS. 1a and 1b illustrate perspective views of two meat cuts 10 that include chine bones 12, rib bones 14, a spinal groove 16, and a meat product 18. In FIG. 1a, the meat product 18 is a rib cut of beef. In FIG. 1b, the meat product 18 is a loin cut of beef. Lines 20 and 21 indicate exemplary cut lines along which the chine bones 12 can be separated from the meat product 18. The exact position of the cut line can vary depending on the source animal (e.g., bovine, porcine, poultry, etc.), the size and shape of the meat cut 10, and the desired meat product 18. For certain bone-in meat cuts for example, it may be desirable to establish a cut line that intersects the spinal groove 16, such as shown with line 21.

Traditionally, the chine bones 12 have been separated from the meat product 18 using a manually operated band-saw or similar device. Accordingly, the chining process is difficult, time consuming, labor intensive and potentially presents worker safety challenges. Moreover, the chining process is highly variable due to variations in the type, size, shape and anatomy of the meat cuts (referred to herein as meat cut "characteristics"). These variations present a challenge to preparing consistent meat cuts with the lowest possible yield loss.

Accordingly, there is a need for systems and methods of separating chine bones from meat cuts that overcome one or more of the challenges described above.

SUMMARY OF THE INVENTION

The present invention provides meat fabrication systems and methods. In one embodiment, the system includes a conveyor adapted to receive a plurality of meat cuts that include chine bones, and to advance the meat cuts along a surface of the conveyor. The system further includes a cutting assembly positioned with respect to the surface to define a cutting path that intersects the surface at an angle of less than 90 degrees, and at least one guide positioned to orientate the meat cuts relative to the cutting path such that at least a portion of the chine bones are separated from the remaining portions of the meat cuts as the meat cuts advance through the cutting path that intersects the surface of the conveyor.

In one embodiment, the cutting assembly includes a saw having a saw blade that extends through an opening in the surface to define the cutting path. In another embodiment, the cutting path intersects the surface. In a further embodiment, the angle and/or position of the cutting path is adjustable relative to the surface of the conveyor.

In certain embodiments, the system may further include a control system adapted to regulate the operation of one or more aspects of the system. For example, the control system can include a power source connected to the cutting assembly, an imaging assembly for obtaining characteristics of the meat cuts, and a processor for determining a cutting path based on the characteristics and for communicating with the power source to adjust the position or angle of the cutting path based on the characteristics of the meat cuts.

In a further embodiment, the present invention provides a method for separating chine bones from a meat cut. The method includes the steps of positioning the meat cut on a conveyor that includes an elongate surface, conveying the meat cut along the elongate surface towards a meat cutting assembly that defines a cutting path, orientating the meat cut relative to the cutting path, and conveying the meat cuts through the cutting path to separate at least a portion of the chine bones from the meat cuts.

DETAILED DESCRIPTION

Figure 1A:
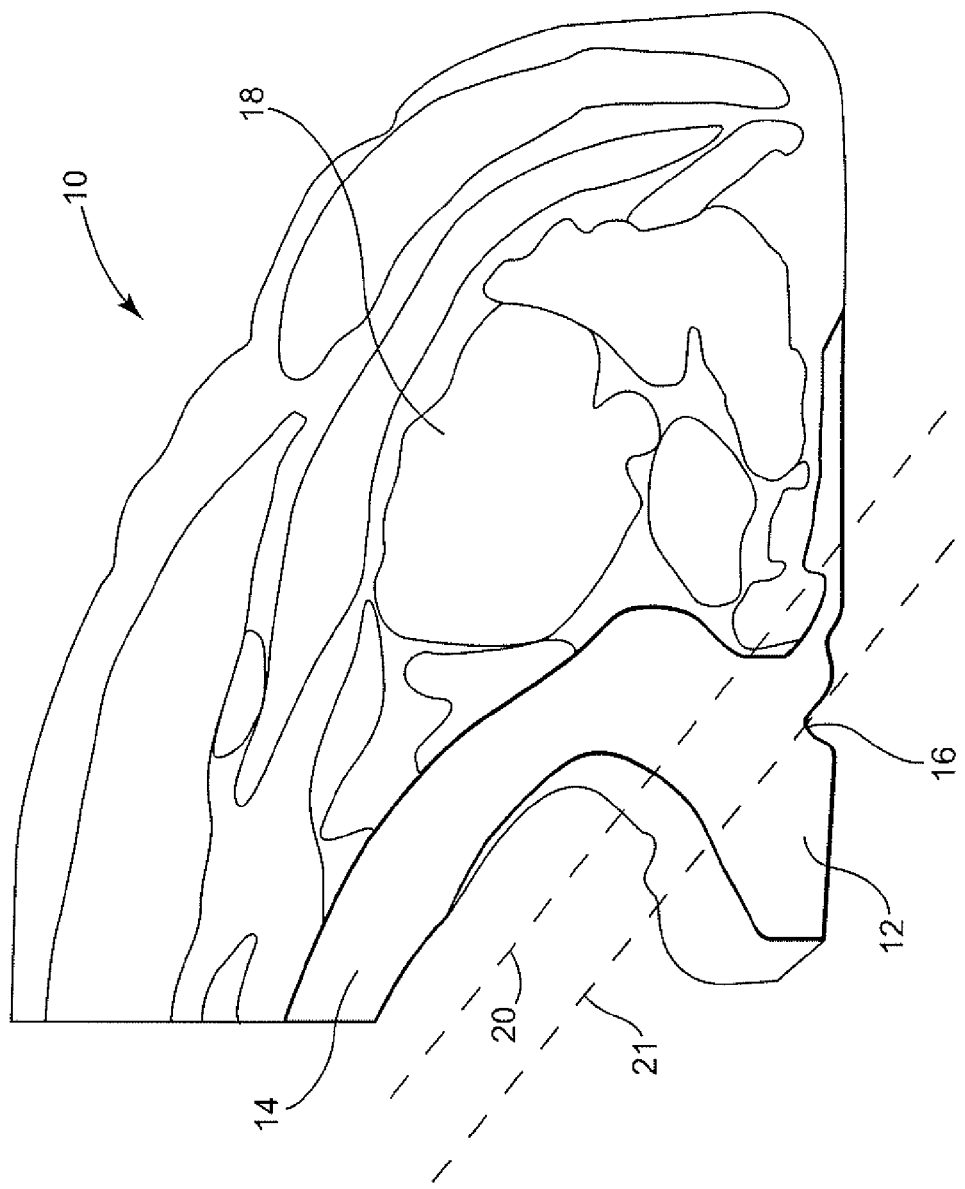
FIGS. 1a-1b illustrate two meat cuts suitable for processing according to embodiments of the present invention.

FIGS. 2-7 show multiple views of a chine separation system 100 according to one embodiment of the present invention. The system 100 generally includes a work surface 102, a conveyor assembly 104, and a cutting assembly 106.

The work surface 102 is a generally horizontal surface supported by legs 108, 110, 112 and 114. The work surface 102 supports the conveyor assembly 104, and also includes an elongate surface 112 along which meat portions are advanced by the conveyor assembly 104. The conveyor assembly 104 includes a conveyor belt 116 actuated by a power source (not shown) and a plurality of panels 118 that advance meat cuts from a first end 120 to a second end 122 of the elongate surface 112.

The cutting assembly 106 includes a saw 124 and a support assembly 126. The saw 124 includes a saw blade 128 that actuates around two wheels 130, 132 similar to a band saw. The wheels 130, 132 are positioned such that the saw blade 128 extends through an opening 134 in the elongate surface 112. The saw assembly 124 is actuated by a power source 135 and in one embodiment, can be operated using a control system as described below with reference to FIG. 9.

Figure 5:
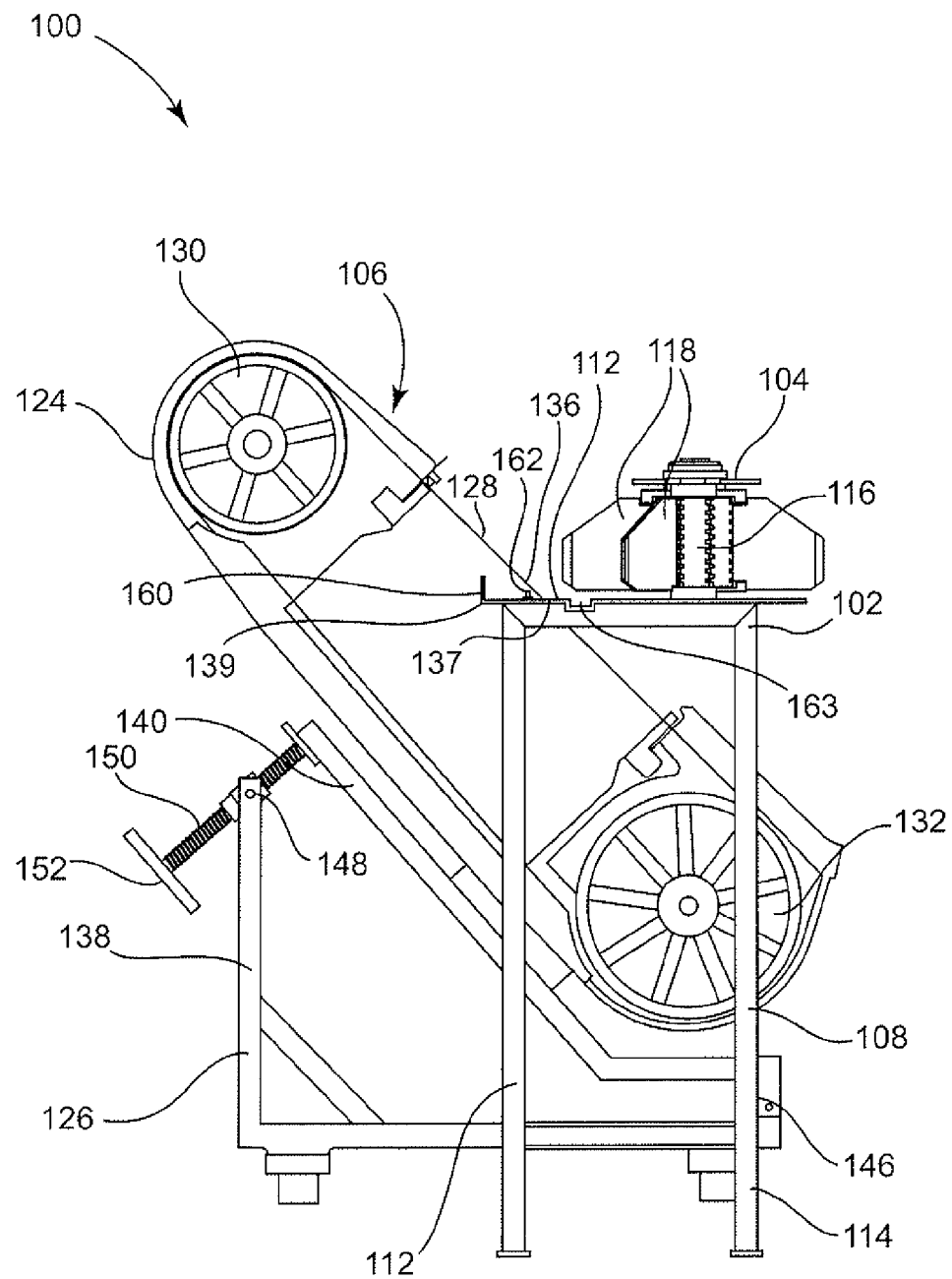
FIG. 5 is an end view of the system shown in FIG. 2.

As shown in FIG. 5, the saw blade 128 defines a cutting path 136 that intersects with the elongate surface 112 such that meat cuts that advance along the elongate surface 112 are conveyed through the cutting path 136. In the illustrated embodiment, the cutting path 136 is orientated at an angle with respect to the elongate surface 112 to separate the chine bones from remaining portions of the meat cuts. In one embodiment, the cutting path 136 has angle of less than 90 degrees relative to the elongate surface 112. In another embodiment, the angle is between about 20 and about 65 degrees. In a further embodiment, the angle is between about 30 and about 55 degrees. In yet a further embodiment, the angle is between about 40 and about 55 degrees. The optimal angle may vary depending on the type and characteristics of the meat cut. If the meat cut is a rib cut for example, the angle of the cutting path may be between about 40 and about 45 degrees. For loin cuts, the angle may be between about 50 and about 55 degrees.

The cutting path 136 includes an intersection point 137, which is the point where the cutting path 136 and the elongate surface 112 intersect. In one embodiment, the intersection point 137 is between about 2 and about 6 inches, more particularly, between about 2.5 to about 5 inches, from an edge 139 of the conveyor area. The distance from the intersection point 137 to the edge 139 may also vary depending on the type, size and other characteristics of the meat cut being processed.

Although the illustrated embodiments utilize a band saw as part of the cutting assembly 106, a variety of saws including table saws and circular saws could be utilized. Furthermore, in embodiments of the present invention, cutting assemblies that use laser or water cutting technology could be utilized to define the cutting path 136. Water cutting assemblies used in the food fabrication industry are commercially available from FMC Technologies, Inc (Houston, Tex.).

The support assembly 126 includes a base 138 and a saw support 140. The base 138 is slidably secured to rails 142 (see FIG. 7) to provide for lateral movement of the base 138 for reasons discussed in greater detail below. The saw support 140 is secured to the base 138 by linking mechanisms 146, 148. The linking mechanism 146 acts as a pivot point between the saw support 140 and the base 138. The linking mechanism 148 includes a shaft 150 and handle 152 that allows the saw support 138 to move relative to the base 134 for reasons discussed below. The saw 124 is secured to and supported by the saw support 140.

Figure 6:
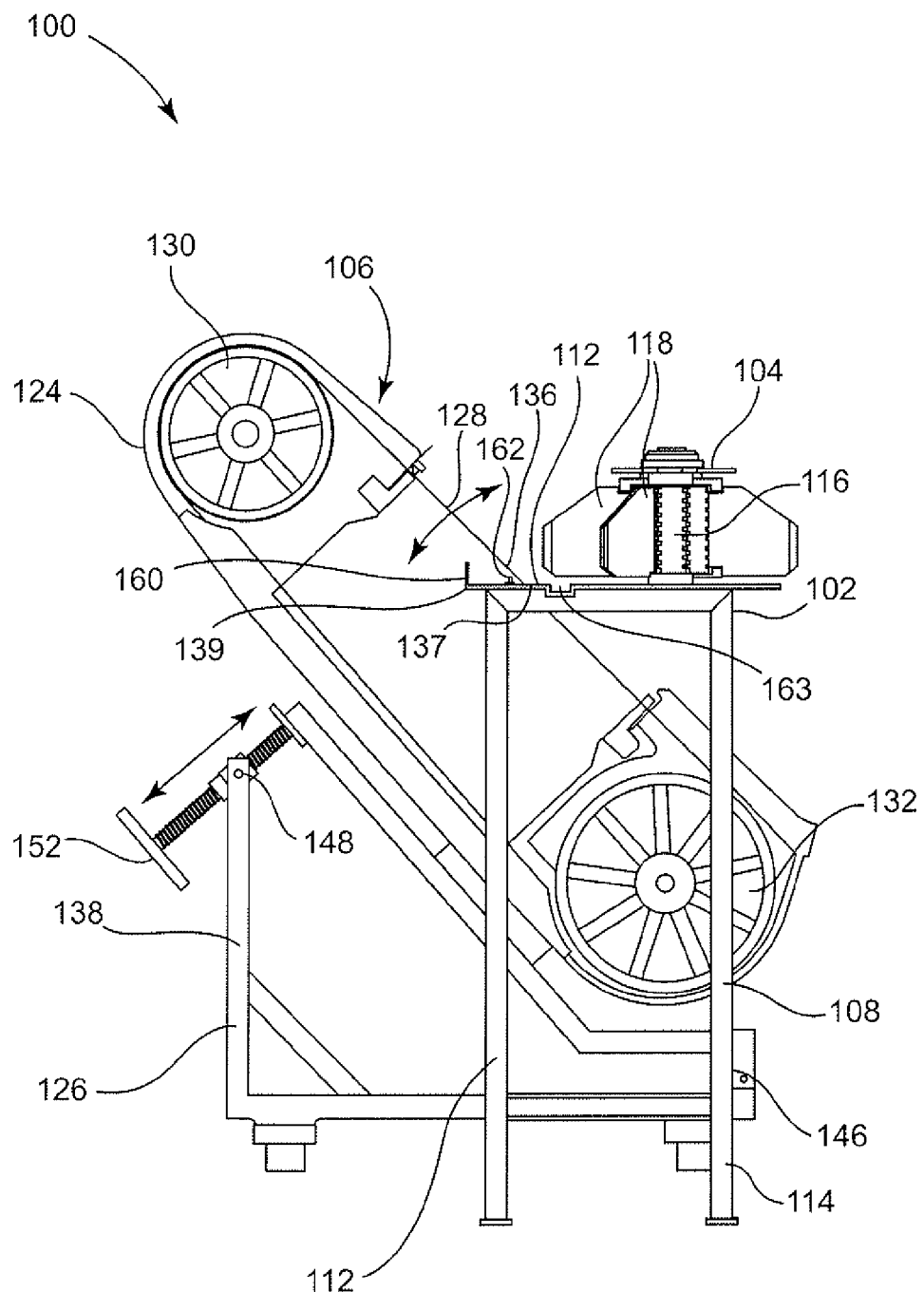
FIG. 6 is an end view of the system shown in FIG. 2.
Figure 7:
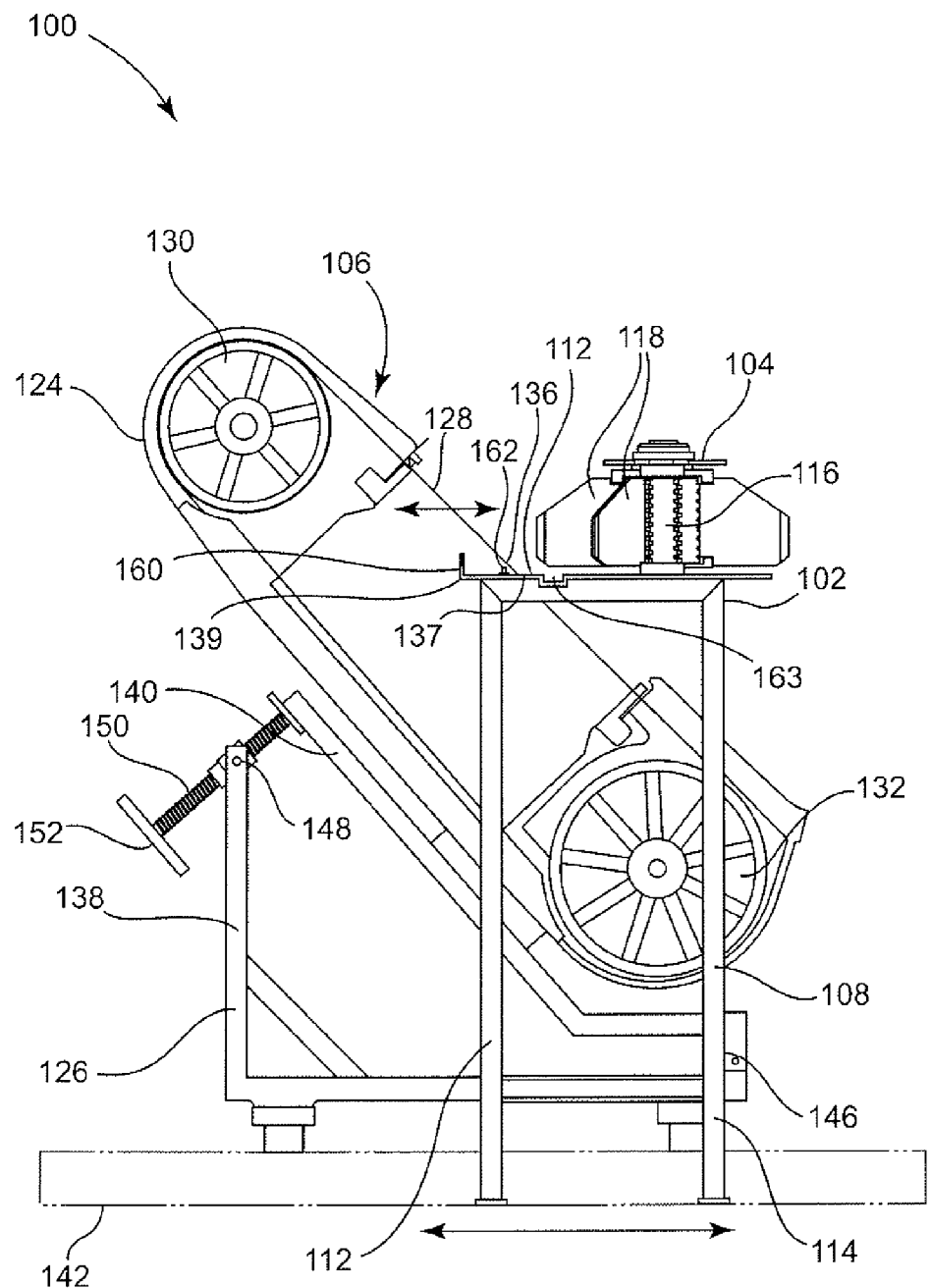
FIG. 7 is an end view of the system shown in FIG. 2.

As further shown in FIGS. 6 and 7 the support assembly 126 described above provides the saw 124 with two degrees of freedom with respect to the elongate surface 112. As shown in FIG. 6, the angle of the saw blade 128 can be adjusted by rotating a handle 152 to elevate or descend the saw support 140. In one embodiment, the angle of the saw blade 128 and its cutting path 136 can be varied from about 20 degrees to about 65 degrees relative to the elongate surface 112. Although the illustrated embodiment shows a manual adjustment feature, a power actuated adjustment feature known in the art could also be used.

Figure 9:
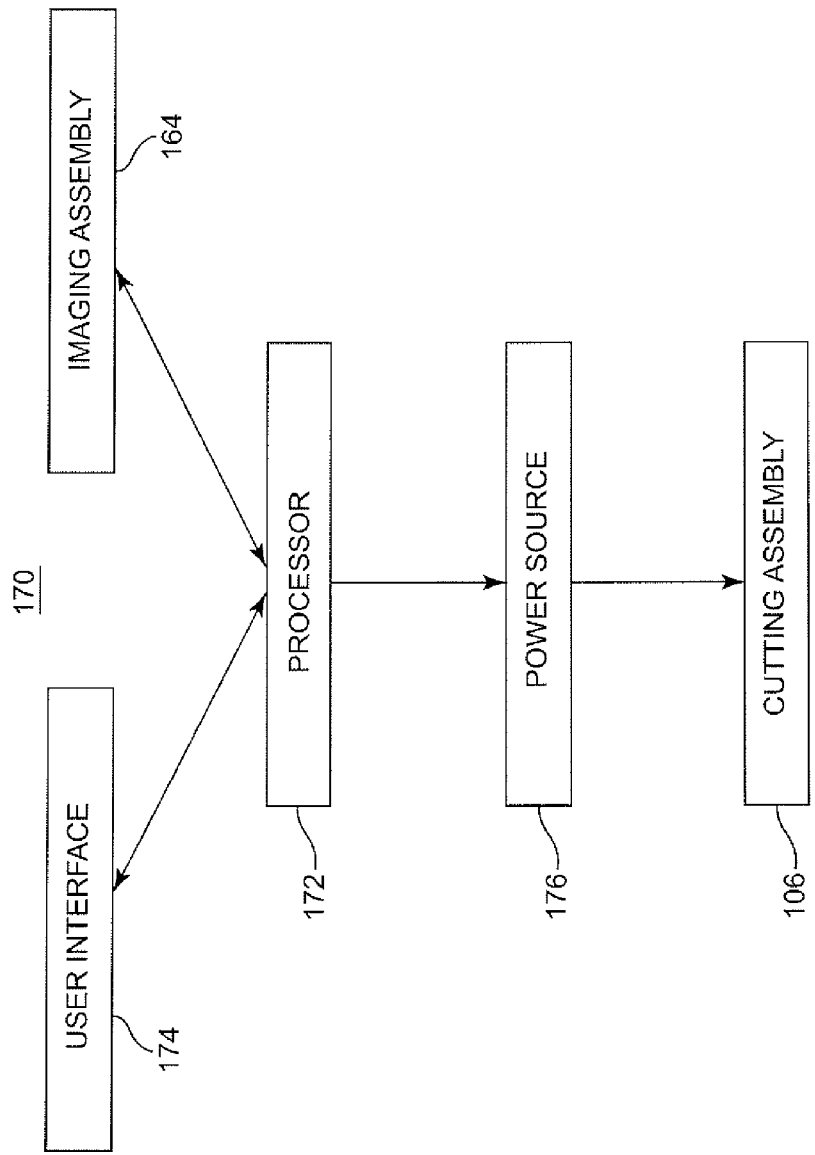
FIG. 9 is a schematic illustration of a control system according to an embodiment of the present invention.

As further shown in FIG. 7, the base 138 can be moved laterally along rails 142 in order to move the saw blade 128 in a direction transverse to the longitudinal axis of the elongate surface 112. In one embodiment, for example, the intersection point 137 can be moved from between about 2 inches to about 6 inches from the edge 139 of the elongate surface 112. This lateral movement of the support assembly 126 may be manual or automated using any one of a variety of known techniques. FIG. 9 illustrates a control system for providing such lateral movement according to one embodiment of the present invention.

By providing at least two degrees of freedom with respect to the saw 124, the cutting path 136 through which the meat cuts are conveyed can be adjusted based on the characteristics of particular meat cuts and/or other desired cutting parameters. As further described below with reference to FIG. 9, some or all of these adjustments can be automated using a control system.

Returning to FIGS. 2-7, the system 100 further includes one or more guides for orientating meat cuts relative to the cutting path 136 in order to separate the chine bones from remaining portions of the meat cuts. Although the number and type of guides can vary depending on the particular embodiment, the guides illustrated in FIGS. 2-7 include a flange 160 extending along the edge 139 of the elongate surface 112, and a ridge 162 and an adjacent groove 163 that each extend along at least a portion of the elongate surface 112, generally parallel to a longitudinal axis of the elongate surface 112. As described in detail with reference to FIGS. 10-12, the flange 160, ridge 162, groove 163 and other guides described with reference to alternate embodiments play an important role in properly orientating meat cuts relative to the cutting path 136 in order to separate the chine bones.

Figure 8:
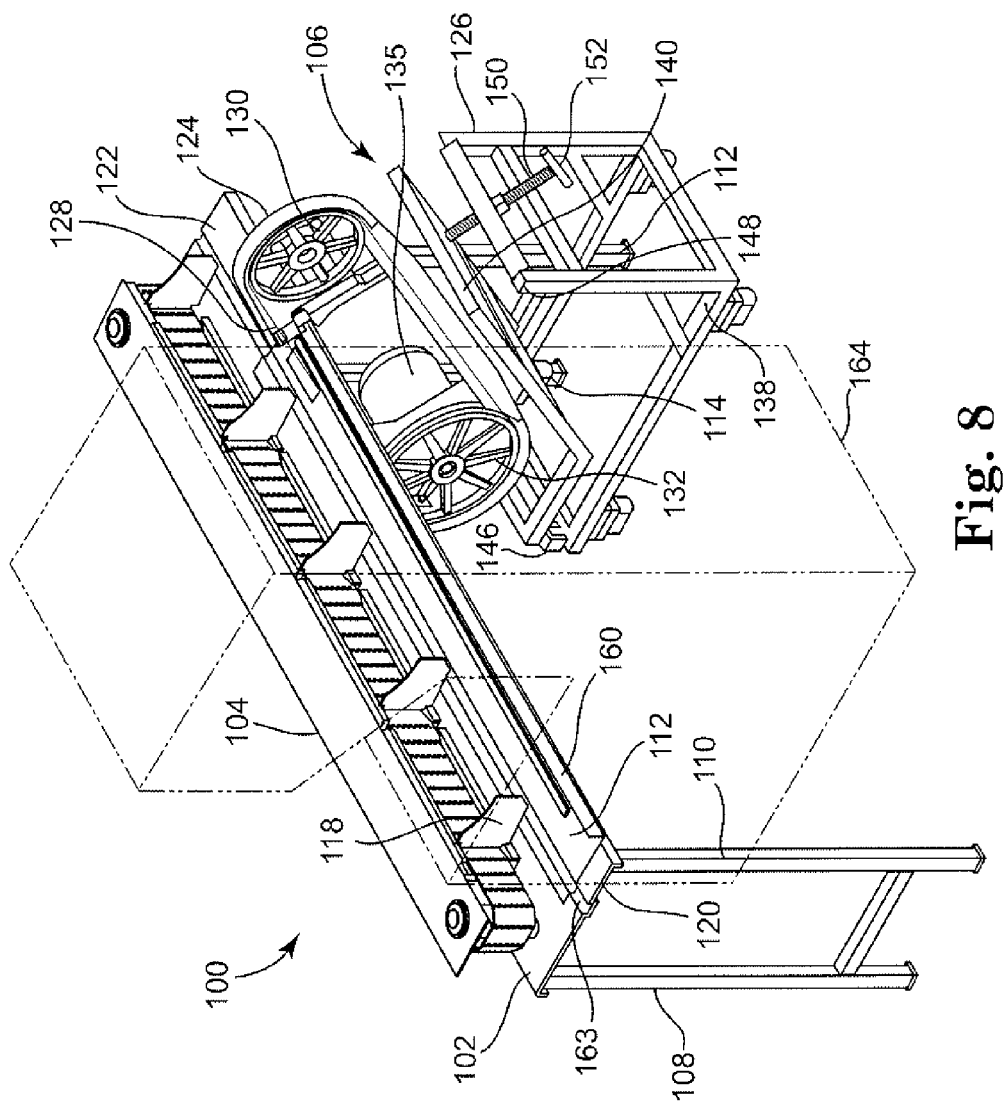
FIG. 8 is a perspective view of another embodiment of a meat fabrication system of the present invention.

FIG. 8 shows another embodiment of the present invention that includes the features of the system shown in FIGS. 2-7 and further includes an imaging assembly 164 secured to the work surface 102. The imaging assembly 164 obtains data relating to the characteristics of a meat cut, and communicates with a control system (see FIG. 9) to adjust the operation of the system 100 accordingly.

For example, measurement of the meat cut characteristics may be accomplished via objective criteria using the imaging assembly 164 to determine color, surface area, linear measures such as length, width, and/or depth, etc., and volume measurements. Suitable imaging assemblies can incorporate X-ray, infrared, camera, video, machine vision, ultrasound, MRI, laser imaging, thermo-graphic imaging, computerized tomography (CT) and other known imaging modalities to determine meat cut characteristics.

As previously noted, embodiments of the present invention can utilize a control system to automate certain operations. FIG. 9 is a schematic illustration of one example of a suitable control system 170, which includes a processor 172, a user interface 174, the imaging assembly 164 shown in FIG. 8 and a power source 176. In use, the imaging assembly 164 obtains data relating to characteristics of meat cuts located on the elongate surface 112 and communicates the data to the processor 172. The processor 172 analyzes the data, determines a desired cutting path 136 and communicates with the power source 176 to actuate the saw assembly 106 to adjust the position and/or angle of the saw blade 128 to establish the desired cutting path 136.

To analyze the data received from the imaging assembly 164, the processor 172 includes software that utilizes an algorithm for determining the appropriate movement of the cutting path 136. Although the software and algorithm will vary depending on the imaging modality, many algorithms incorporate data relating to image pixels to determine bone dimensions, meat thickness and the like.

In certain embodiments, the control system 170 can be operated to start and stop the system 100, to change the speed of the conveyor 104 and/or the saw blade 124. The user interface 164 allows users of the system 100 to observe the activities of the control system 170 and/or to manually operate one or more of the operations described above. In one embodiment, however, the system 100 is capable of operating with minimal or no worker input.

Figure 10:
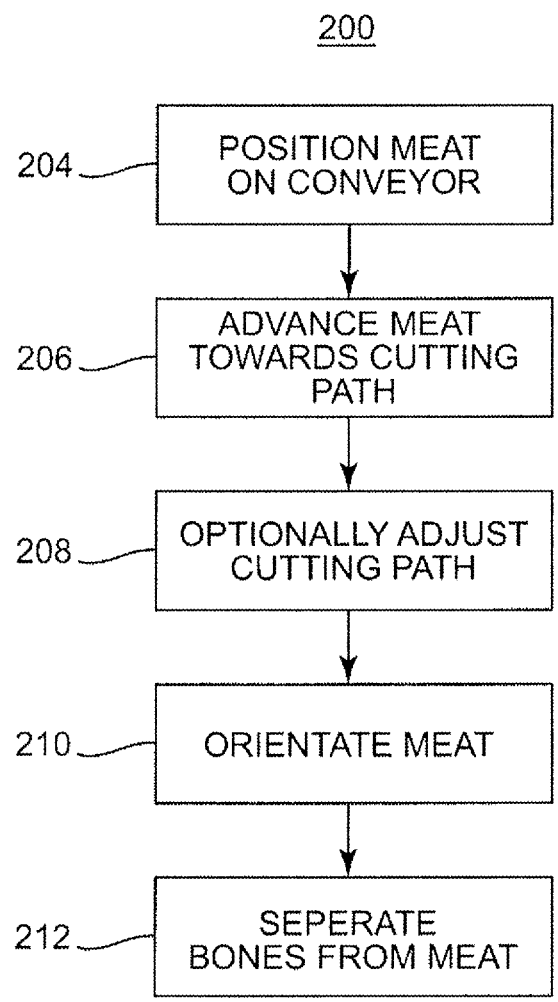
FIG. 10 is a flow chart of a method of removing chine bones from a meat cut according to an embodiment of the present invention.
Figure 11:
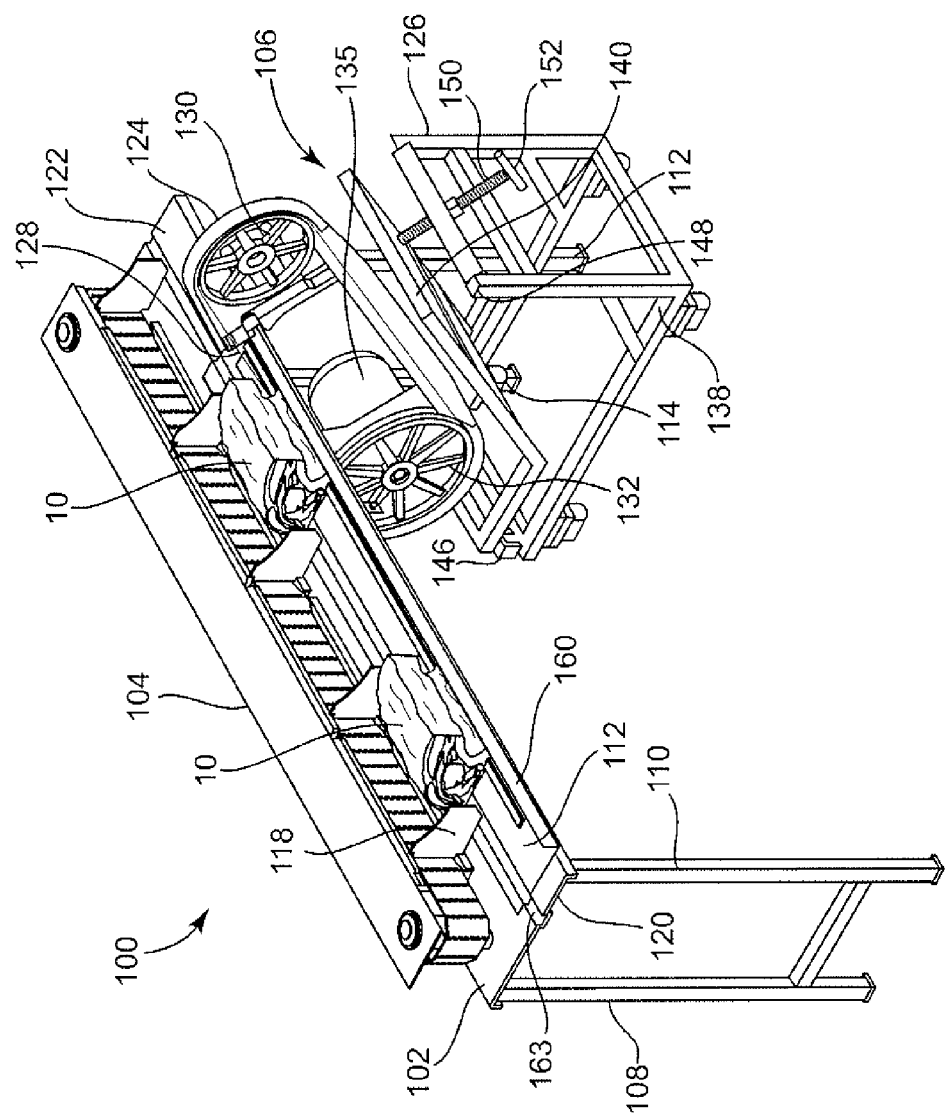
FIG. 11 is a perspective view of the system shown in FIG. 2 in use.
Figure 12:
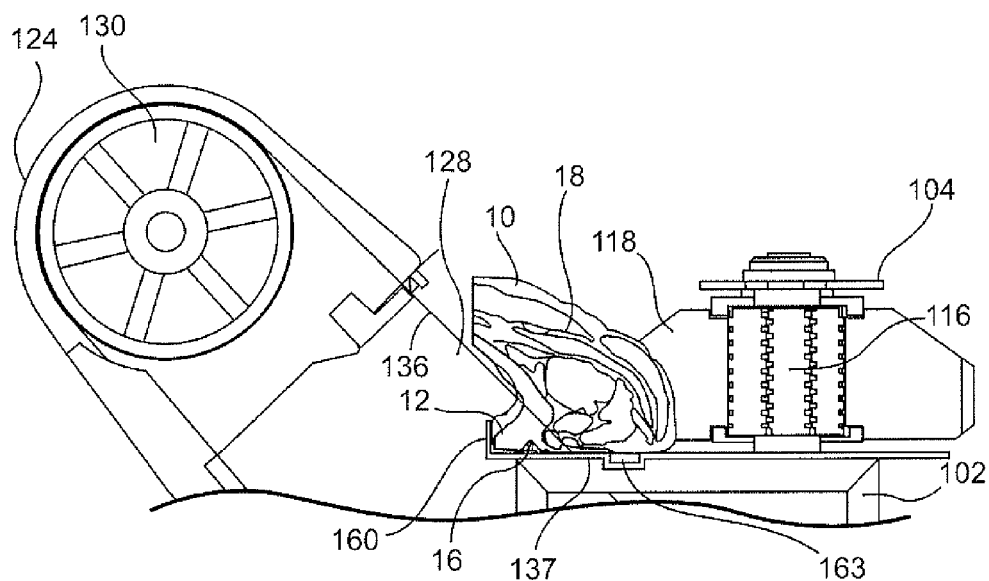
FIG. 12 is an end view of the system shown in FIG. 2 in use.
Figure 13:
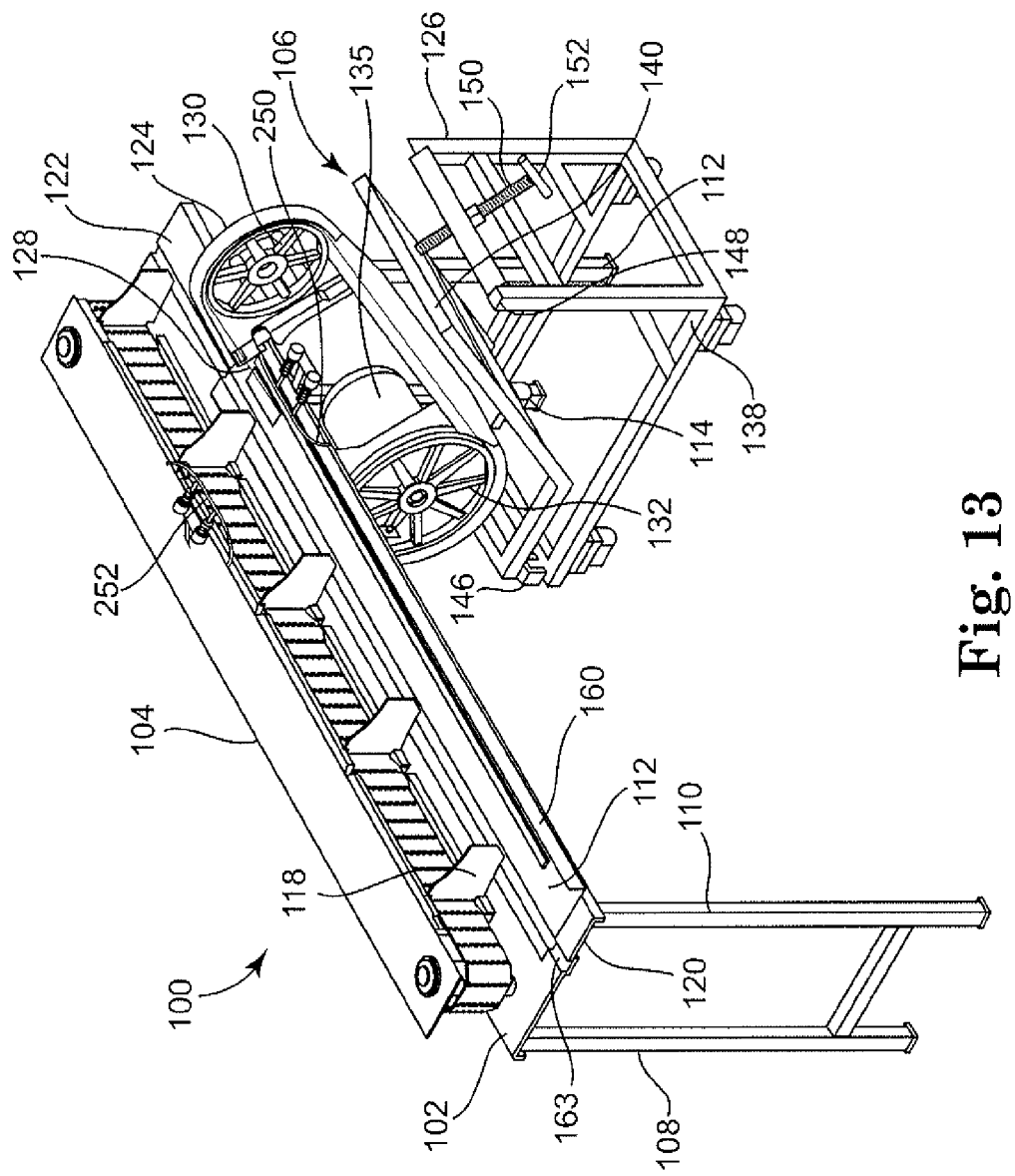
FIG. 13 is a side perspective view of another embodiment of a meat fabrication system according to another embodiment of the present invention.
Figure 14:
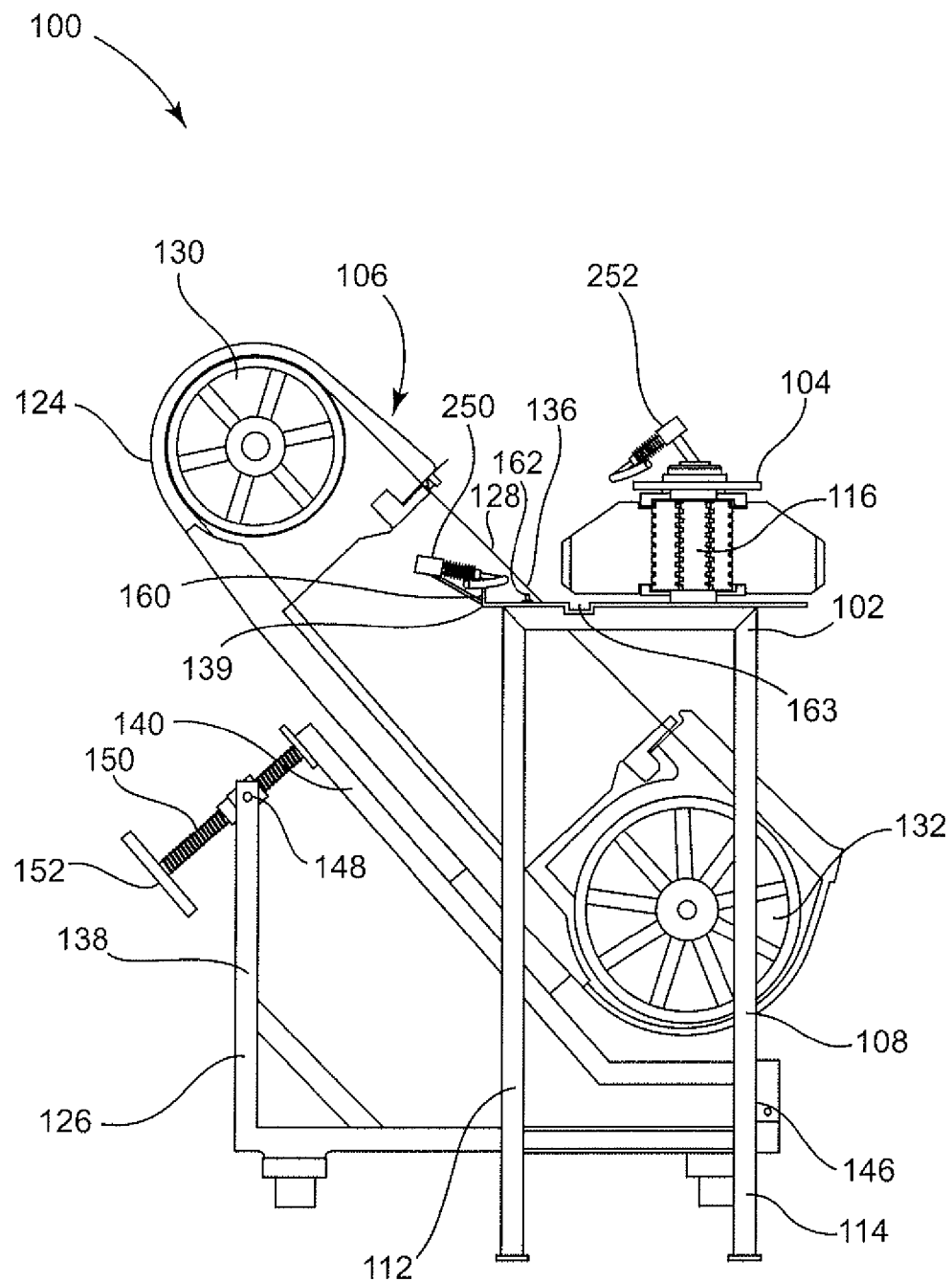
FIG. 14 is an end view of the system shown in FIG. 13.

FIGS. 10-12 describe and illustrate a methods of separating chine bones from a meat cut according to one embodiment of the present invention. FIG. 10 is a flow-chart of the method 200, which generally includes the steps of the positioning a meat cut 10 on the elongate surface 112 (block 204), advancing the meat cut 10 towards the cutting path 136 (block 206), optionally adjusting the position or angle of the cutting path 136 relative to the elongate surface 112 (block 208), orientating the meat cut 10 relative to the cutting path 136 using the guides (block 210), and then advancing the meat cut 10 through the cutting path 136 to separate the chine bones 12 from the meat cut 202 (block 212).

FIGS. 11 and 12 show respective side and end views of the system 100 in use, in which meat cuts 10 are disposed on the elongate surface 112. Suitable meat cuts 10 are shown and described with reference to FIGS. 1a and 1b.

The meat cuts 10 are initially positioned near the first end 120 the elongate surface 112 as shown in FIG. 9 such that the spinal groove 16 is aligned with the ridge 162, the meat cut 18 is aligned with the groove 163, and the chine bones 12 and surrounding tissue are immediately adjacent (and may contact) flange 160. The meat cuts 10 can be positioned in this manner manually or via a conveyor system that transports the meat cut 10 from a prior processing step.

When the conveyor assembly 104 is in operation, the belt 116 urges the panel 118 into contact with the meat cuts 10 such that the meat cuts 10 are advanced along the elongate surface 112 towards the cutting path 136. The flange 160, ridge 162 and groove 163 orientate the meat cuts 10 that approach the cutting path 136, and may continue to guide the meat cuts 10 through the cutting path 136 while the chine bones 12 are separated.

If the optional-imaging assembly 164 is utilized, data relating to the characteristics of the meat cut 10 are obtained and communicated to the processor 172 as the meat cut approaches. The processor 172 then communicates with the power source 176 to adjust the position of the cutting path 136, as described above, prior to the meat cut 10 reaching the cutting path 136.

The meat portion 10 is then advanced up to and through cutting path 136, with the flange 160, ridge 162 and groove 163 orientating the meat cut 10 relative to the cutting path 136 such that the chine bones 12 are removed with minimal loss of the meat product 18. After separation of the chine bone 12, the meat product 18 can be transferred to additional processing stations, which may include processes that produce boneless meat products. The chine bones 12 can be discarded or further processed as desired.

FIGS. 13-17 show additional embodiments of the system 100 shown and described in FIGS. 2-11. The system 100 shown in FIGS. 13 and 14 includes the features of the system shown in FIGS. 2-7, and further includes additional guides for orientating the meat cuts 10 relative to the cutting path 136. In particular, the system 100 includes rails 250, 252 on opposing sides of the elongate surface 112, and generally adjacent to the cutting path 136. The rail 250 is positioned to contact and orientate the chine bones 12 of the meat cut 10, while the rail 252 is positioned to contact and orientate the meat product 18 that is to be separated from the chine bones 12.

The rails 250, 252 in the illustrated embodiment are spring loaded to receive and/or apply a force to meat cuts 10 having varying characteristics, and are generally shaped and positioned to further orientate the meat cut 10 just prior to and/or during cutting. It is further evident that the rails 250, 252 have arcuate surfaces that further orientate the meet cut 10 through the cutting path 136. These arcuate surfaces may have multiple bends or curves to optimize orientation of the meat cuts.

Although not shown in this embodiment, additional rails such as an overhead rail could be included to further optimize the orientation of the meat relative to the cutting path 136. Additionally, although rails 250, 252 are illustrated as being spring-loaded, pneumatic or hydraulic cylinders could be incorporated to apply a force to the meat cut 10. These cylinders could be used to positively adjust the position of the rails 250, 252 based on characteristics of the meat cut 10, as opposed to adjusting only when contacted by a meat cut 10. Alternatively, the rails 250, 252 could be fixed in a single position.

Figure 15:
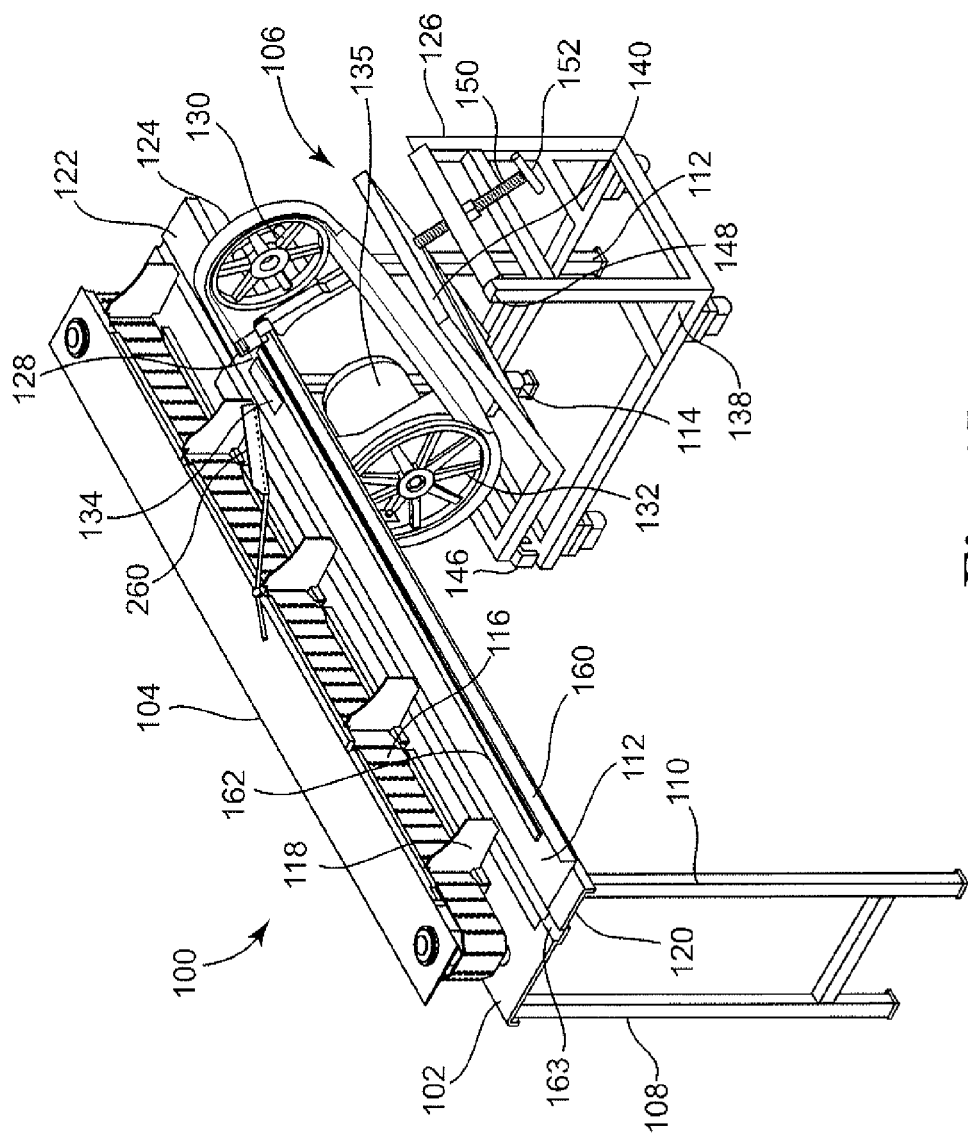
FIG. 15 is a side perspective view of another embodiment of a meat fabrication system according to another embodiment of the present invention.
Figure 16:
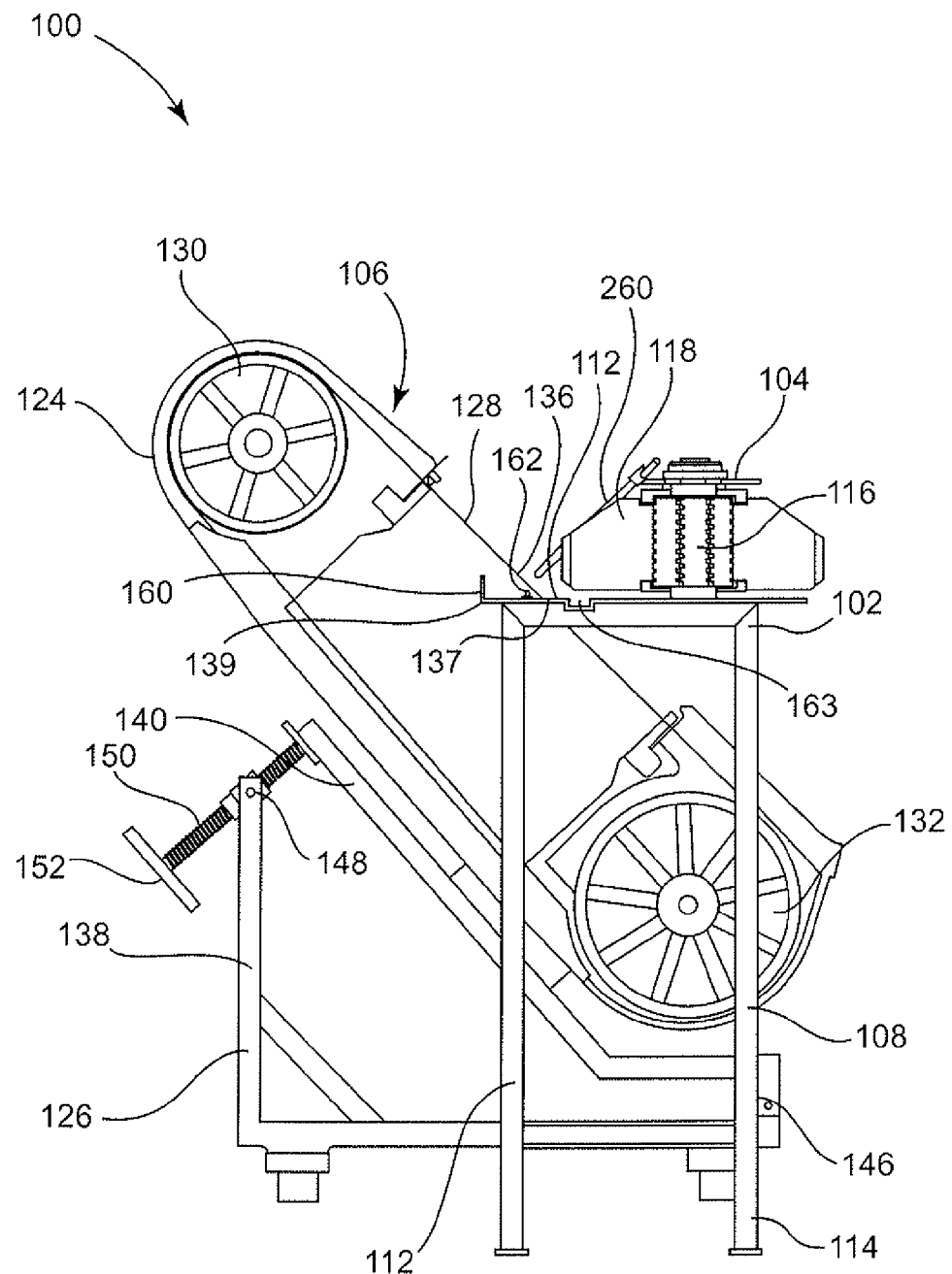
FIG. 16 is an end view of the system shown in FIG. 15.

FIGS. 15 and 16 illustrate another embodiment of the present invention, which includes an arm 260, that contacts the meat portion 10 during separation of the chine bones 12. As illustrated, the arm 260 is spring-loaded, and is designed to contact and orientate the meat cut 18 from the chine bones 12. As with rails 250, 252, the arm 260 could incorporate a piston and/or cylinder to apply a force to the meat cut and/or adjust automatically based on the characteristics of the meat cut.

Figure 17:
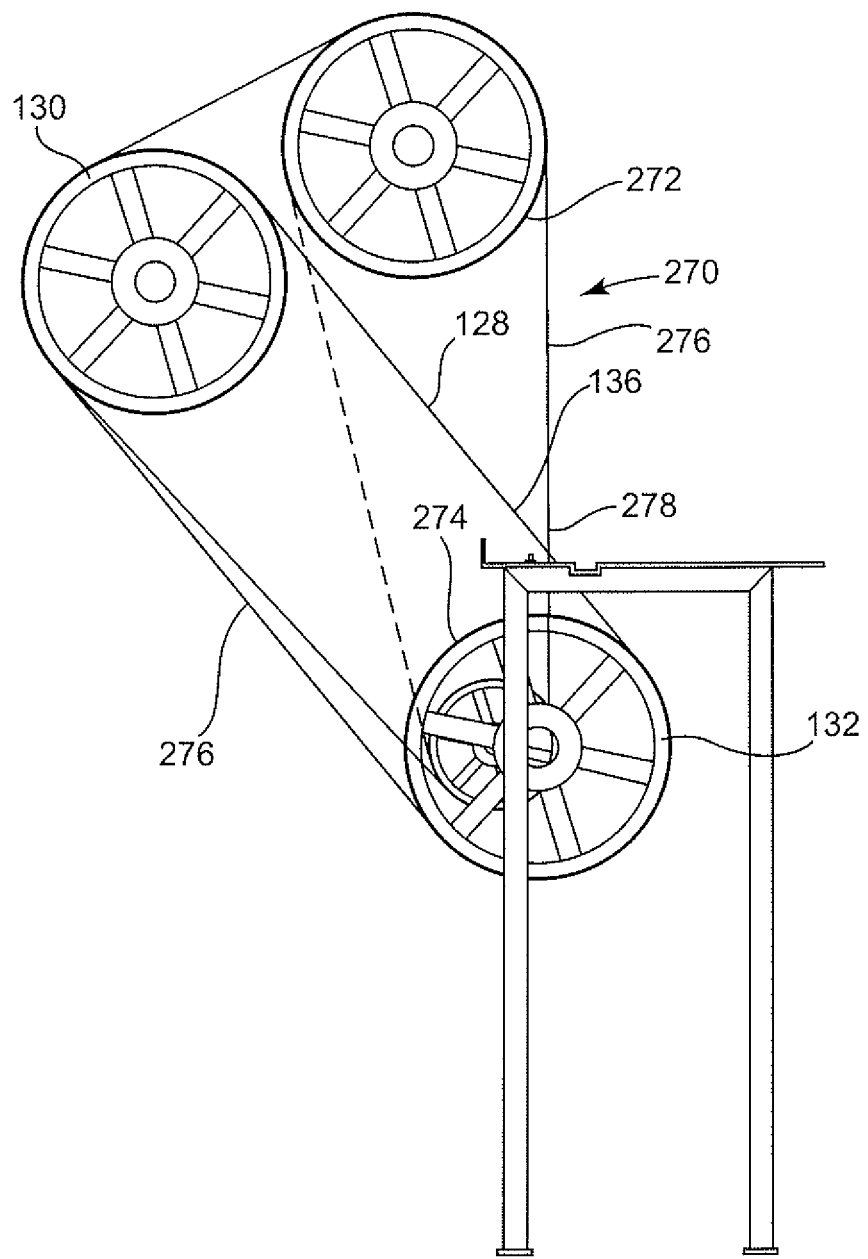
FIG. 17 is an end view of a chine removal system according to another embodiment of the present invention.

FIG. 17 illustrates another embodiment of the present invention, in which the cutting assembly 106 includes a second saw 270 adjacent to the saw 124. The saw 270 includes wheels 272, 274 and a saw blade 276. The blade 276 is orientated to provide a cutting path 278 that is vertical or nearly vertical relative to the elongate surface 112. In one embodiment for example, the cutting path 278 of blade 276 is at an angle of between about 75 degrees and about 90 degrees relative to the elongate surface 112.

The saw 270 can be secured to same support assembly 126 as the saw 124, and the position of the cutting path 278 can adjusted in cooperation with the cutting path 136. Alternatively, the saw 270 could utilize a separate support assembly that provides independent movement from the saw 124.

Figure 1B:
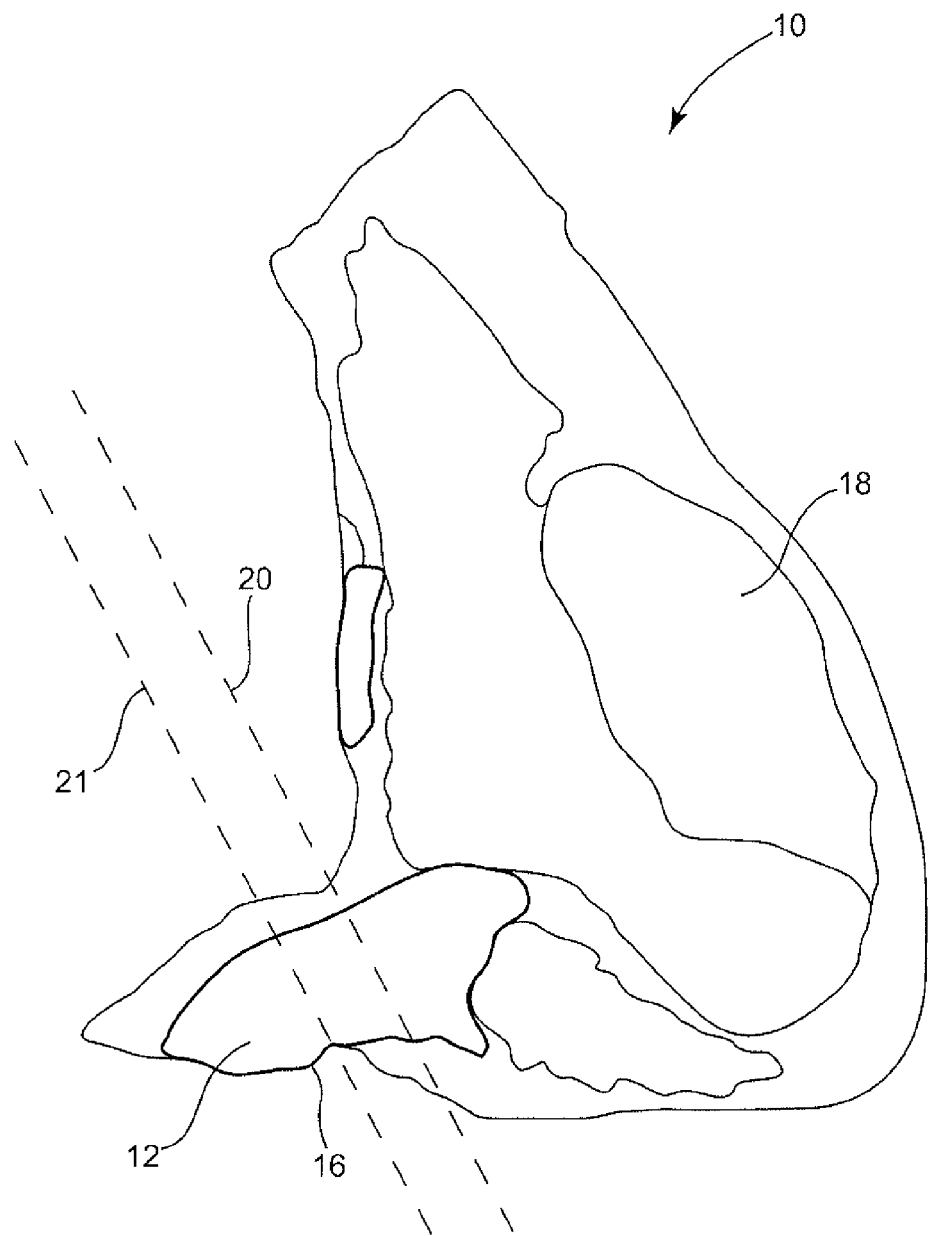
Figure 2:
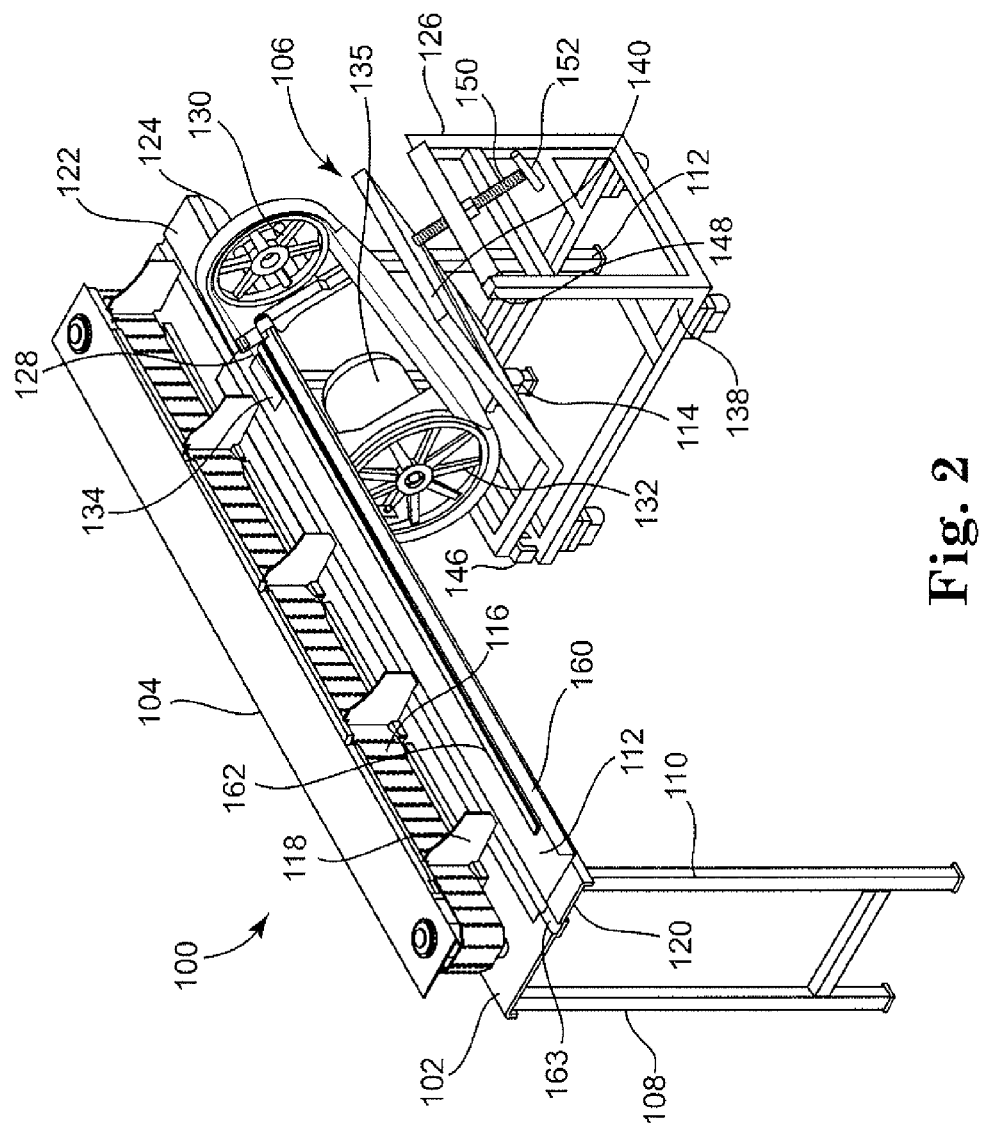
FIG. 2 is a side perspective view of a meat fabrication system of an embodiment of the present invention.
Figure 3:
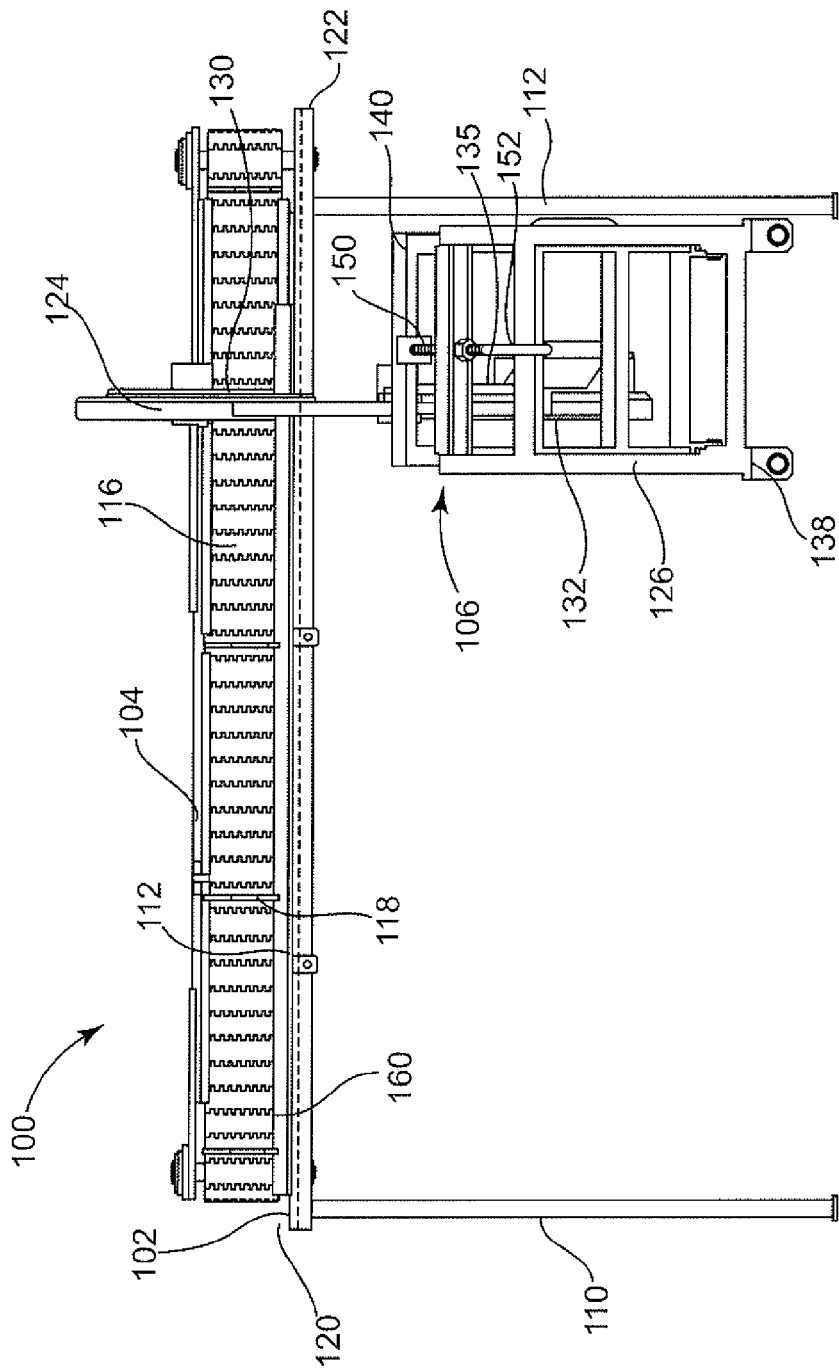
FIG. 3 is a side view of the system shown in FIG. 2.
Figure 4:
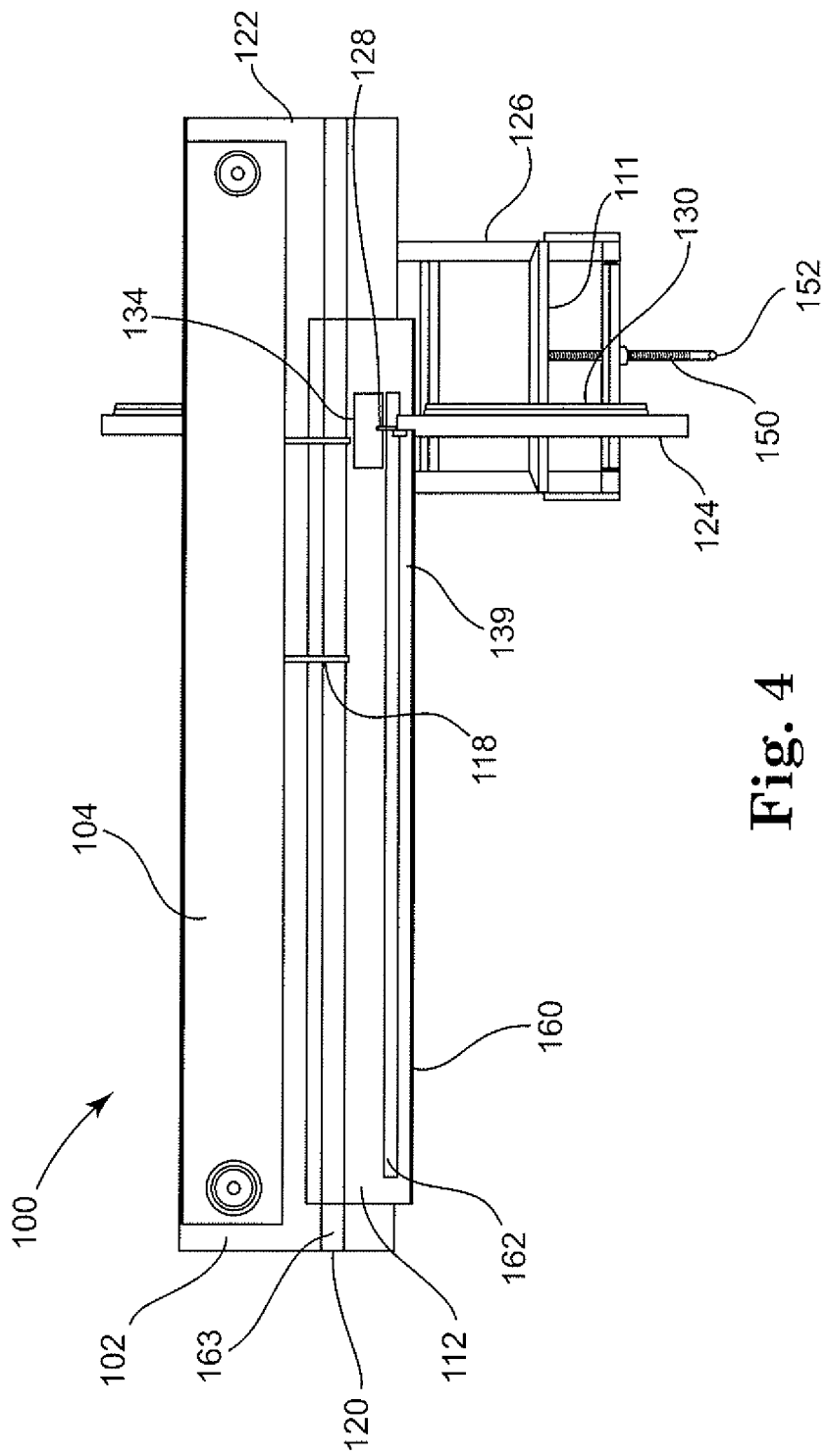
FIG. 4 is a top view of the system shown in FIG. 2.

The addition of the saw 270 and/or additional saws further optimizes the cutting process, and is specifically designed to reduce the amount of waste produced when separating the chine bones from beef meat cuts such as the meat cuts shown in FIG. 1b.

While different embodiments of the invention have been described herein, it is evident that various modifications, alternatives and combinations to the described features embodiments could be utilized in light of the overall teachings of the disclosure. For example, any one of the various guides used to orientate the meat portions could be combined together, or certain guides could be eliminated so long as the meat portion are properly orientated by the remaining guide or guides relative to the position of the cutting path or paths.

Similarly, depending on the number and types of guides that are employed, it may not be necessary for the saw assembly to provide for lateral or rotation movement. More specifically, it may be possible for the guides to sufficiently orientate the meat to eliminate the need to modify the cutting path in the lateral and/or rotational direction.

Moreover, the desired alignment of the meat cut will vary depending on the meat cut characteristics as well as the desired meat product. The cut lines shown in the FIGS., for example, are positioned to separate all (or a substantial portion) of the chine bones in order to prepare boneless meat products. If bone-in meat cuts are desired, however, the cut line may be positioned to leave a portion of the chine bones with the meat product. The present invention can accomplish multiple cut lines by orientating the meat cut relative to a generally fixed cutting path, by moving the cutting path relative to the orientation of the meat cut, or by both orientating the meat cut and moving the cutting path.

Accordingly, the particular arrangements are illustrative only and are not limiting as to the scope of the invention which is to be given the full breadth of any and all equivalents thereof.

The invention claimed is:

1. A method for removing chine bones from a meat cut comprising:
   positioning the meat cut at one end of a surface of a conveyor, wherein the surface includes at least one arm;
   conveying the meat cut along the surface towards a cutting assembly that defines a cutting path that intersects with the elongate surface between the first end and a second ends of the elongate surface;
   orientating the meat cut relative to the cutting path, and contacting the meat cut with the arm as the meat cut is conveyed along the surface;
   optionally adjusting the position of the cutting path; and
   conveying the oriented meat cut through the cutting path to separate the chine bones from the meat cut.

2. The method of claim 1 wherein the orientating step includes placing the meat cut such that a spinal groove of the meat cut contacts the surface.

3. The method of claim 1 wherein the surface includes a ridge extending along a portion of the surface in a direction generally parallel to a longitudinal axis of the surface, and wherein the orientating step includes aligning the spinal groove with the ridge.

4. The method of claim 1 wherein the surface includes at least one groove, and wherein the orientating step comprises aligning a portion of the meat cut with the groove.

5. The method of claim 1 wherein the surface includes at least one rail extending along one side of the surface, and wherein the orientating step includes contacting the meat cut with the rail as the meat cut is conveyed along the surface.

6. The method of claim 5 wherein the surface includes a plurality of rails and wherein the orientating step includes contacting the meat cut with at least one of the plurality of rails.

7. The method of claim 1 wherein the arm contacts the meat cut as the meat cut is conveyed through the cutting path.

8. The method of claim 1 further comprising the step of adjusting the position of the cutting path relative to the surface.

9. The method of claim 8 wherein the adjusting step comprises adjusting the position of the cutting path in a direction transverse to a longitudinal axis of the surface.

10. The Method of claim 8 wherein the adjusting step comprises adjusting the angle of the cutting path relative to the surface.

11. The method of claim 8 further comprising the step of obtaining characteristics of the meat cut and adjusting the position of the cutting path based on the characteristics.

12. The method of claim 1 further comprising the step of processing the meat cut into a boneless meat product.

\* \* \* \* \*